No. 629,383. Patented July 25, 1899.
C. MACKEPRANG, A. F. PETERSEN & J. F. MÖLLER.
HOOK FOR BOAT DETACHING APPARATUS.
(Application filed Mar. 8, 1899.)
(No Model.)
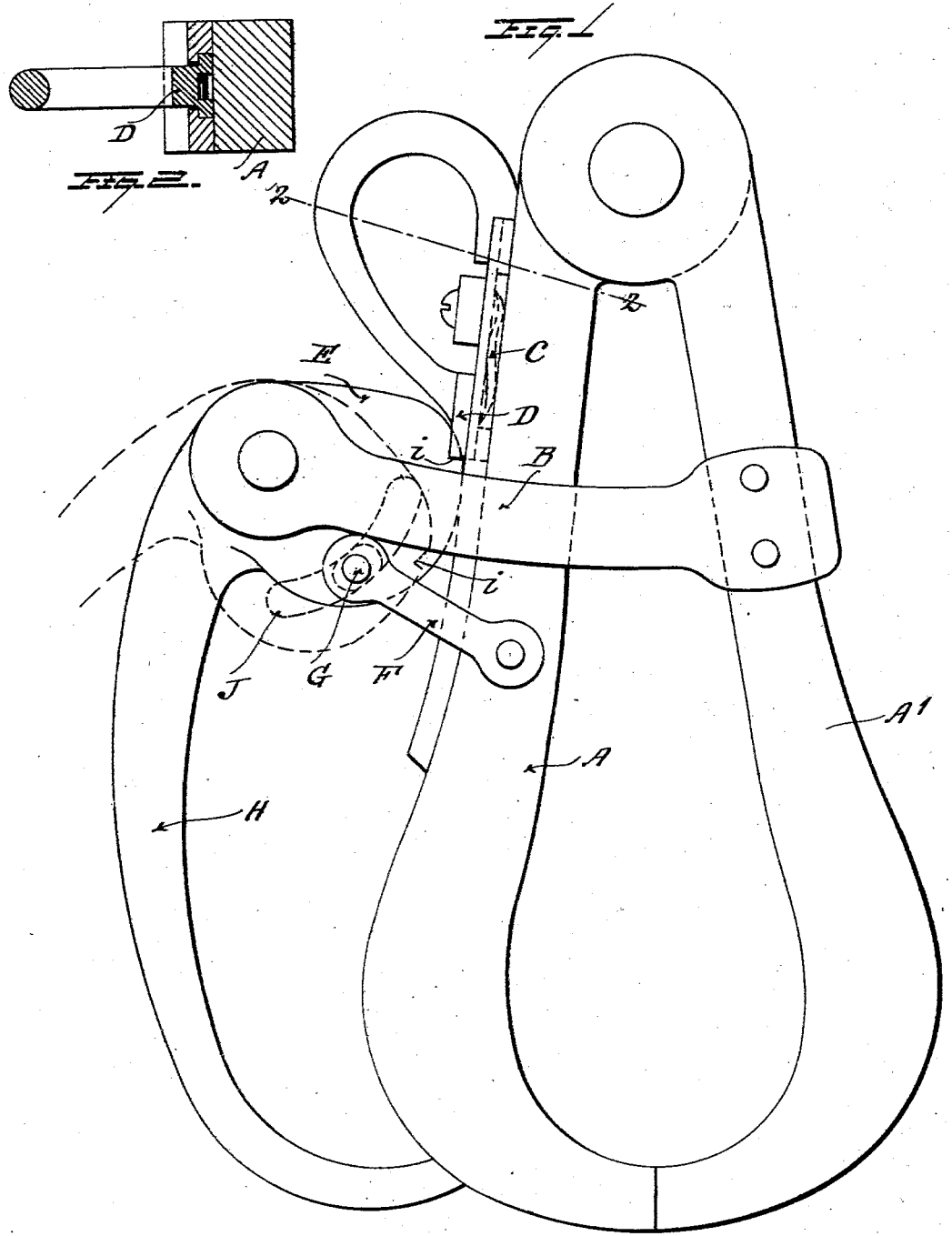
Witnesses
Inventors
C. Mackeprang
A. F. Petersen
J. F. Möller
by their Attorney

UNITED STATES PATENT OFFICE.

CHRISTIAN MACKEPRANG, AUGUST F. PETERSEN, AND JÜRGEN F. MÖLLER, OF KIEL, GERMANY.

HOOK FOR BOAT-DETACHING APPARATUS.

SPECIFICATION forming part of Letters Patent No. 629,383, dated July 25, 1899.

Application filed March 8, 1899. Serial No. 708,278. (No model.)

*To all whom it may concern:*

Be it known that we, CHRISTIAN MACKEPRANG, AUGUST FRIEDRICH PETERSEN, and JÜRGEN F. MÖLLER, subjects of the German Emperor, and residents of Kiel, Germany, have invented a certain new and useful Improved Hook for Boat-Detaching Apparatus, of which the following is a specification.

The object of the present invention is a hook for boat-detaching apparatus or similar purposes where sudden detachment is required.

The hook consists, essentially, of two legs or sister hooks movable around a pivot and bent together to meet at their ends and which can be opened or closed by means of a lever with an eccentric boss pivoted in an iron loop fixed on one leg, the said boss having bearing against the outside of the other leg, to which the lever may also be connected by a short link, the pin of which moves in a slot in the eccentric boss of the lever. When the hook is closed, a slide engages into a recess in the eccentric to prevent the accidental opening of the hook.

The annexed drawings represent the invention.

Figure 1 is an elevation thereof, the full lines showing the hook when closed, and the dotted lines the same when open. Fig. 2 is a cross-section on the line 2 2 of Fig. 1.

This hook consists, essentially, of two legs or sister hooks A A', movable around a pivot and bent together to meet at their lower ends. They can be opened or closed by means of a lever H, moved by hand with an eccentric boss E, pivoted in an iron loop B, fixed on one leg A' of the said lever, the boss E having bearing against the outside of the other leg A, to which it may also be connected by a short link F, the pin G of which moves in a slot J in the eccentric boss E of the lever H.

When the hook is closed, a slide D, moved by hand, engages into a recess $i$ in the eccentric E to prevent the accidental opening of the hook.

The slide D is frictionally held in place by the spring C.

We claim as our invention—

In a hook for boat-detaching apparatus or other purposes the combination of two legs A A' pivoted together, a loop B attached to one leg, a lever H with eccentric boss E pivoted in said loop B and adapted to bear against leg A to close the same and a slide D adapted to engage a recess $i$ of the eccentric boss E to prevent the accidental opening of the hook substantially as described.

In witness whereof we have signed this specification in the presence of two witnesses.

CHR. MACKEPRANG.
A. F. PETERSEN.
J. F. MÖLLER.

Witnesses:
F. CHINSTEDI,
E. H. L. MUMMENHOFF.